United States Patent [19]

Dietzsch et al.

[11] Patent Number: 4,671,810
[45] Date of Patent: Jun. 9, 1987

[54] ARRANGEMENT FOR THE FILTERING OF A SUPPLY AIR FLOW, ESPECIALLY FOR MOTOR VEHICLES

[75] Inventors: Kurt Dietzsch, Leonberg-Eltingen; Hans-Dieter Oess, Stuttgart, both of Fed. Rep. of Germany

[73] Assignee: Sueddeutsche Kuehlerfabrik Julius Fr. Behr GmbH & Co. KG, Fed. Rep. of Germany

[21] Appl. No.: 804,439

[22] Filed: Dec. 4, 1985

[30] Foreign Application Priority Data

Dec. 4, 1984 [DE] Fed. Rep. of Germany ....... 3444126

[51] Int. Cl.⁴ ............................................. B01D 50/00
[52] U.S. Cl. ....................................... 55/309; 55/316; 55/328; 55/422
[58] Field of Search ................... 55/96, 274, 309, 310, 55/316, 328, 422

[56] References Cited

U.S. PATENT DOCUMENTS

| | | | |
|---|---|---|---|
| 1,816,836 | 8/1931 | Gagen | 55/422 X |
| 1,914,667 | 6/1933 | Kolla | 55/274 |
| 2,509,300 | 5/1950 | Hendrickson | 55/422 X |
| 2,978,068 | 4/1961 | Pierfederici | 55/422 |
| 3,086,342 | 4/1963 | Goettl | 55/328 X |
| 3,411,272 | 11/1968 | Carmon | 55/328 X |
| 3,744,976 | 7/1973 | Tongue | 55/316 X |
| 3,839,848 | 10/1974 | Wood et al. | 55/96 |
| 3,861,894 | 1/1975 | Marsh | 55/316 |
| 4,231,769 | 11/1980 | Ahlrich | 55/328 X |
| 4,312,645 | 1/1982 | Mavros et al. | 55/328 X |

FOREIGN PATENT DOCUMENTS

| | | |
|---|---|---|
| 0075054 | 9/1981 | European Pat. Off. . |
| 0171399 | 3/1905 | Fed. Rep. of Germany . |
| 1536756 | 1/1970 | Fed. Rep. of Germany . |
| 3330950 | 3/1985 | Fed. Rep. of Germany . |

*Primary Examiner*—Robert Spitzer
*Attorney, Agent, or Firm*—Barnes & Thornburg

[57] ABSTRACT

For the filtering of supply air, especially in the case of motor vehicles, a filter that is divided into two parts is arranged inside a housing. The two parts of the filter can be swivelled apart around swivel shafts arranged in their end areas so that, when required, an air passage means can be exposed for the passage of unfiltered air.

18 Claims, 2 Drawing Figures

ARRANGEMENT FOR THE FILTERING OF A SUPPLY AIR FLOW, ESPECIALLY FOR MOTOR VEHICLES

BACKGROUND AND SUMMARY OF THE INVENTION

This invention relates to an arrangement for the filtering of a supply air flow, especially for motor vehicles, which contains a filter that is arranged in a housing and can be swivelled out of the supply air flow.

Generally, in arrangements of the above-mentioned type, the filter is swivelled out of the supply air flow when large amounts of air are required for the passenger space. Since the filter must also be swivelled against the supply air flow, the actuating forces are relatively high. In addition, a relatively large space is required to allow the swivelling of the filter out of the supply air flow. Since this space is not available in many motor vehicles, a larger filtering volume that would be possible otherwise cannot be obtained.

Another known arrangement provides for bypassing the filter by means of a bypass pipe which is controlled by a flap. In this arrangement also, a relatively large space is required so that this solution, because of the normally limited space conditions in motor vehicles, can be realized only be sacrificing filtering volume.

An objective of the present invention is to provide an arrangement for filtering a supply air flow that maximizes the filtering volume and can create a free air passage when throughflow of large quantities of air are desired, yet minimizes the space that is required.

This objective is achieved by dividing the filter into two parts rotatably mounted on parallel swivel means for swivelling the two parts away from one another, for the exposing of an air passage means therebetween.

In this arrangement, the two parts need to make only relatively small swivel movements in order to expose a relatively large air passage. The additional space required for the swivelling-out of the two parts is therefore also relatively small so that a large filtering volume is possible. In addition, the actuating forces for the swivelling of the two parts of the filter are smaller because the forces exercised on the filter parts by the supply air flow are lower. During the swivelling-together operation as well as during the swivelling-apart of the filter parts, the supply air flow promotes the swivelling of one of the parts of the filter.

In a preferred embodiment of the present invention, the filter is arranged in a housing in such a way that both parts, in the swivelled-together position, are located in a plane disposed at an angle of approximately 45° with respect to the supply air flow. The rectangular portion of the housing is angled at approximately 45° so that a large filter area is presented to the supply air flow. In the swivelled-apart position, the filter parts are approximately parallel to the direction of the supply air flow. As a result, a large-volume and large-surface filter can be located in a housing that needs to have widened portions only slightly larger than normal to permit the swivelling-away of the filter parts from one another. A preferred embodiment provides that the part of the filter which, in the swivelled-together position, is located closer to the air inlet, be swivelled away in the flow direction of the supply air flow, while the other part of the filter is swivelled away against the flow direction of the supply air flow. The additional space that is required for the swivelling-away is the relatively minor hollow areas of the housing.

In order to fit the two parts of the filter closely together in the closed position, in a preferred embodiment of the invention, a dividing plane extends between the parts of the filter approximately tangentially to arcs described by the swivelling of the parts.

In practice, filters are used that are formed by filter mats arranged behind one another, with the filter mat facing the supply air flow being a submicron particulate air filter, and the filter mat facing away being an activated-carbon filter. In a preferred embodiment of the present invention, the filter contains at least two filter mats arranged behind one another in the flow direction of the supply air flow, which are divided at the dividing plane extending approximately tangentially to the arcs described by the swivelling of the filter parts. In order to allow a wide tolerance for the dividing planes while avoiding throughflow of unfiltered air when the filter is closed, in a preferred embodiment the dividing planes between the identical filter mats are staggered with respect to one another. Also, a third dividing plane is provided that extends between and perpendicular to the two tangential dividing planes.

In a preferred embodiment of the invention, a combined adjusting drive for the two parts of the filter is provided and is arranged outside the housing. This adjusting drive can be relatively small because during both the swivelling-together and the swivelling-apart operations, only one part of the filter must swivel against the flow direction of the supply air flow.

Further objects, features and avantages of the present invention will become more apparent from the following description when taken with the accompanying drawings, which show for purpose of illustration only, an embodiment constructed in accordance with the present invention.

DETAILED DESCRIPTION OF THE DRAWINGS

Figure 1:
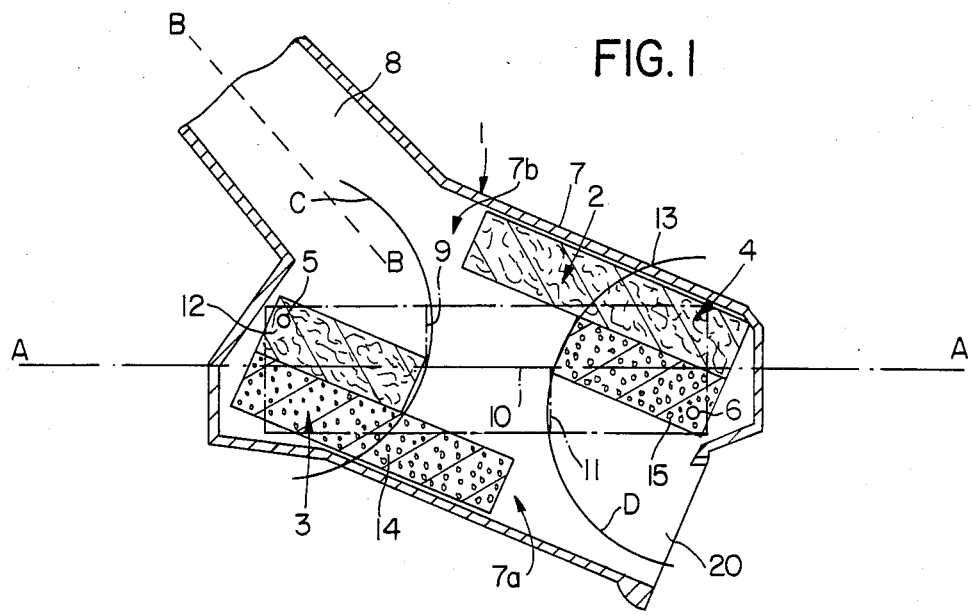
FIG. 1 is a sectional view of a preferred embodiment of the present invention.

In the embodiment of the invention as shown in FIG. 1, a housing 1 is provided that has a rectangular portion 7 with an air inlet portion 8 at one end and an air outlet 20 at the other end. The air inlet portion 8 is connected to a fan (not shown) which provides the supply air flow. The air outlet 20, in a manner not shown in detail, through distributing devices, is connected to the interior of a motor vehicle and can also be connected to an inlet of a heating and/or air conditioning system.

The major axis A of the rectangular portion 7 is disposed at an angle of about 45° with respect to the axis B of the air inlet portion 8. A filter 2 is arranged inside this rectangular portion 7 and lies in a plane that is sloped approximately 45° with respect to the direction of the supply air flow along axis B (position of the filter 2 in FIGS. 1 and 2 that is shown by an interrupted line). The filter 2 has two parts 3 and 4, each of which, in a preferred embodiment, is comprised of two filter mats 12 and 14, and 13 and 15 respectively. The filter mats 12 and 13 facing the air inlet are of the same construction and serve as submicron particulate air filters. The filter mats 14 and 15 behind the submicron particulate air filters 12 and 13 are activated-carbon filters.

The filter mats 12 and 13, which are located upstream of the supply air flow, are divided at a dividing plane 9 extending approximately tangentially to the arc C described by the swivelling of the filter mat 12. The filter parts 3 and 4 are mounted to swivel around swivel shaft 5 and 6 respectively. These swivel shafts 5 and 6 are respectively located in the area of the ends of the two parts 3 and 4. The swivel shaft 5 of part 3 arranged closer to the air inlet portion 8 is disposed in the corner facing the air inlet portion 8. The swivel shaft 6 of part 4 is parallel to swivel shaft 5 and is disposed in the corner area of part 4 facing the air outlet 20. Between the two mats 14 and 15, another dividng plane 11 extends approximately tangentially to the arc D described by the swivelling of filter mat 15. The dividing planes 9 and 11 are staggered with respect one another so that a center is created in which a third dividing plane 10 exists between the filter mat 13 of part 4 and the filter mat 14 of part 3, which extends perpendicularly to the two dividing planes 9 and 11.

As shown in FIG. 1, the two parts 3 and 4 can be swivelled around their shafts 5 and 6 such that a separation takes place at the dividing planes 9, 10 and 11. Thus, in this area, an air passage is created for the throughflow of unfiltered air. This passageway is opened when large amounts of air are to be supplied to the interior of the vehicle. As shown in FIG. 1, part 3 is swivelled around the shaft 5 away from the air inlet piece 8 in the flow direction of the supply air flow. Part 4, on the other hand, is swivelled open around the shaft 6 against the flow direction of the supply air flow. Since the swivel shafts 5 and 6 are each arranged in the end areas of the parts 3 and 4 that are facing away one another, this swivelling in opposing directions relative to the dividing plane 10 results from the turning of the parts 3 and 4 in the same rotational direction around the swivel shafts 5 and 6.

During the swivelling-away, the parts 3 and 4 rotate into the funnel-shaped areas 7a and 7b of the rectangular portion 7 in front of and behind the filter 2 respectively. These funnel-shaped areas 7a and 7b are required in any event in order to obtain a good flow through the filter 2 that is arranged in an angled position. Therefore, the space required for the swivelling away of parts 3 and 4 from each other is only insignificantly larger than that previously needed. During the swivelling together of the parts 3 and 4 of the filter 2, part 3 is swivelled against the flow direction of the supply air flow, while part 4 is swivelled in the flow direction. Thus, both during the opening and the closing of the filter 2, only one part 3 or 4 is swivelled against the flow direction, while the swivel movement of the other part is aided by the supply air flow. As a result, only relatively low actuating forces are required for the swivelling-apart and the swivelling-together operations.

Figure 2:
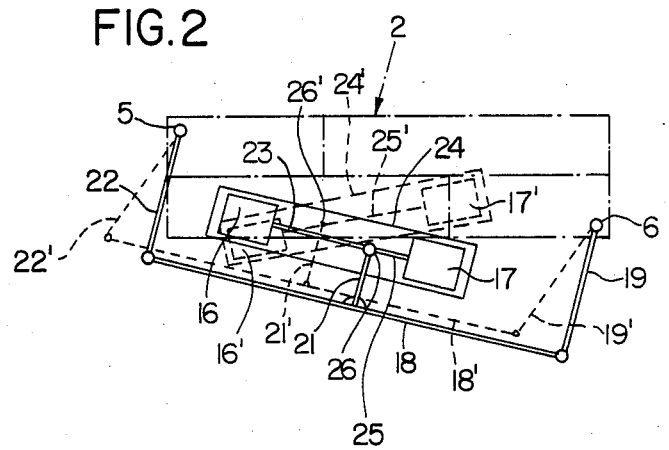
FIG. 2 is a schematic view of a driving mechanism for the embodiment of FIG. 1.

Since the two parts 3 and 4 are each swivelled around their swivelling shafts 5 and 6 in the same rotational direction, a driving mechanism can be provided in a simple manner, as schematically shown in FIG. 2. In the preferred embodiment illustrated in FIG. 2, levers 22 and 19 are coupled to the swivel shafts 5 and 6 which are connected with the filter parts 3 and 4 in a rotationally stable manner, the levers 22 and 19 being connected with one another by a rod 18. The rod 18 is then, through a rigid intermediate piece 21, connected to the adjusting drive mechanism which in the illustrated embodiment comprises two vacuum boxes 16 and 17 which each act in one direction. In a further preferred embodiment that is not illustrated, only one vacuum box is used instead of two vacuum boxes, the vacuum box acting against a restoring spring. In another contemplated embodiment, electric motor operators such as step motors are used. Individual drives may also be provided for each of the parts 3 and 4 which are controlled simultaneously.

It is also contemplated to provide a drive mechanism that allows the two parts 3 and 4 to take positions intermediate to the shown end positions.

The vacuum boxes 16 and 17 illustrated in FIG. 2 are connected by a rod 25 and the intermediate piece 21 is pivoted at one point 26. The vacuum boxes 16 and 17 are arranged on a common plate 24 which is pivoting around the swivel axis 23 when the driving mechanism is operated. The position of the swivel axis results from the intersection of those lines corresponding to the two final positions of the rod 25. The position of the driving mechanism with the filter being open is shown by dotted lines in FIG. 2, the corresponding means being marked with an additional (') to the reference symbol.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. An arrangement for the filtering of a supply air flow, which contains a filter arranged in a housing between an air inlet having a central axis and an air outlet connected to the housing, comprising:
   said filter having a first part and a second part located in a common plane that is at a non-perpendicular angle to said central axis when in a filtering position, said first and second parts contacting each other in said filtering position, and
   two swivel means mounted parallel to each other in said housing, for rotatably mounting said first and second parts in said housing to swivel away from one another to an open position for exposing an air passage therebetween, said first and second parts lying in approximately parallel planes in said open position.

2. The arrangement according to claim 1, wherein said housing for housing said first and second parts when said first and second parts are in a filtering position has a rectangular portion with its central axis at an angle of approximately 45° with respect to the central axis of said air inlet.

3. The arrangement according to claim 1, wherein said swivel means are shafts arranged in the area of the opposite corners of said first and second parts.

4. The arrangement according to claim 1, wherein said first part is swivelled in the supply air flow direction and said second part is swivelled against the supply air flow direction.

5. The arrangement according to claim 1, wherein at least one dividing plane extends between said first and second parts of said filter approximately tangential to the arc described by the swivelling of said first filter part.

6. The arrangement according to claim 1, wherein said filter contains at least two filter mats arranged behind one another in the supply air flow direction, said filter mats being separated by at least one dividing plane extending approximately tangential to the arcs described by the swivelling of said filter mats.

7. The arrangement according to claim 6, including two parallel dividing planes between divisions of said filter mats, staggered with respect to one another, and a third dividing plane extends between and perpendicularly to said dividing planes.

8. The arrangement according to claim 7, wherein said filter mats disposed in front with respect to the supply air flow direction are divided approximately in the center between said swivel means.

9. The arrangement according to claim 1, including a drive means for driving said first and second parts of said filter.

10. The arrangement according to claim 9, wherein said drive means is arranged outside said housing.

11. An arrangement for the filtering of a supply air flow, which contains a filter arranged in a housing between an air inlet and an air outlet connected to the housing, comprising:
  said filter having a first part and a second part, and
  two swivel means mounted parallel to each other in said housing, for rotatably mounting said first and second parts in said housing to swivel away from one another for exposing an air passage therebetween,
  wherein said filter contains at least two filter mats arranged behind one another in the supply air flow direction, said filter mats being separated by at least one dividing plane extending approximately tangential to the arcs described by the swivelling of said filter mats,
  including two parallel dividing planes between divisions of said filter mats, staggered with respect to one another, and a third dividing plane extends between and perpendicularly to said dividing planes,
  wherein said filter mats disposed in front with respect to the supply air flow direction are divided approximately in the center between said swivel means.

12. An arrangement for the filtering of a supply air flow, which contains a filter arranged in a housing between an air inlet and an air outlet connected to the housing, comprising:
  said filter having a first and second part contacting each other when in a filtering position, and
  two swivel means mounted parallel to each other in said housing, for rotatably mounting said first and second parts in said housing to swivel away from one another for exposing an air passage therebetween,
  wherein said first part is swivelled in the supply air flow direction and said second part is swivelled against the supply air flow direction.

13. The arrangement according to claim 12, wherein said first and second parts can be swivelled by said swivel means to an open position to lie in planes approximately parallel to the supply air flow direction.

14. The arrangement according to claim 13, wherein said housing for housing said first and second parts when said first and second parts are in a filtering position is a rectangular portion with its central axis at an angle of approximately 45° with respect to the central axis of said air inlet.

15. The arrangement according to claim 14, wherein said filter contains at least two filter mats arranged behind one another in the supply air flow direction, said filter mats being separated by at least one dividing plane extending approximately tangential to the arcs described by the swivelling of said filter mats.

16. An arrangement for the filtering of a supply air flow, which contains a filter arranged in a housing between an air inlet having a central axis and an air outlet connected to the housing, comprising:
  said filter having a first part and second part located in a common plane that is at a non-perpendicular angle to said central axis when in a filtering position, said first and second parts contacting each other in said filtering position, and
  two swivel means mounted parallel to each other in said housing, for rotatably mounting said first and second parts in said housing to swivel away from one another to an open position for exposing an air passage therebetween, said first and second parts lying in approximately parallel planes in said open position, and
  wherein said first part is swivelled in the supply air flow direction and said second part is swivelled against the supply air flow direction.

17. The arrangement according to claim 16, wherein said swivel means are shafts arranged in the area of the opposite corners of said first and second parts.

18. The arrangement according to claim 17, wherein said filter contains at least two filter mats arranged behind one another in the supply air flow direction, said filter mats being separated by at least one dividing plane extending approximately tangential to the arcs described by the swivelling of said filter mats.

* * * * *